US012793291B2

(12) United States Patent
Ham et al.

(10) Patent No.: US 12,793,291 B2
(45) Date of Patent: Nov. 10, 2026

(54) DYNAMIC DESIGNING OF TEXTURE FOR GARMENT BY CONFIGURING MANNER OF REPEATING IMAGE

(71) Applicant: CLO Virtual Fashion Inc., Seoul (KR)

(72) Inventors: Hyung Gi Ham, Seoul (KR); Hyo Sup Han, Seoul (KR)

(73) Assignee: CLO Virtual Fashion Inc., Seoul (KR)

( * ) Notice: Subject to any disclaimer, the term of this patent is extended or adjusted under 35 U.S.C. 154(b) by 168 days.

(21) Appl. No.: 18/733,840

(22) Filed: Jun. 5, 2024

(65) Prior Publication Data

US 2024/0331220 A1 Oct. 3, 2024

Related U.S. Application Data

(63) Continuation-in-part of application No. PCT/KR2023/007019, filed on May 23, 2023.

(30) Foreign Application Priority Data

May 23, 2022 (KR) ........................ 10-2022-0062946
May 23, 2023 (KR) ........................ 10-2023-0066416

(51) Int. Cl.
*G06T 11/10* (2026.01)
*G06T 11/60* (2006.01)
*G06T 15/04* (2011.01)

(52) U.S. Cl.
CPC .............. *G06T 11/10* (2026.01); *G06T 11/60* (2013.01); *G06T 15/04* (2013.01); *G06T 2200/24* (2013.01)

(58) Field of Classification Search
None
See application file for complete search history.

(56) References Cited

U.S. PATENT DOCUMENTS

2013/0127889 A1* 5/2013 Winnemoeller ........ G06T 17/20 345/582
2014/0114620 A1 4/2014 Grinspun et al.
2015/0302624 A1* 10/2015 Burke ..................... G06T 11/60 345/600
2019/0100030 A1 4/2019 Landau et al.
(Continued)

FOREIGN PATENT DOCUMENTS

KR 10-1627114 B1 6/2016
KR 10-2136620 B1 7/2020
(Continued)

OTHER PUBLICATIONS

ArahPaint User's Manual. Version 2.8b, Arahne, d.o.o., 1993-2001. PDF file. (Year: 2001).*
(Continued)

*Primary Examiner* — Ryan Mcculley
(74) *Attorney, Agent, or Firm* — WTA IP Law P.C.

(57) ABSTRACT

A simulation method for editing a texture of a garment may include displaying a two-dimensional (2D) canvas corresponding to a basic region of the texture, displaying a 2D texture image on the canvas, receiving a first user input for repeating and displaying the texture image on the canvas, determining an interval parameter between the texture images based on the first user input, a size of the canvas, and a size of the texture image, and displaying the texture images on the canvas based on the determined interval parameter.

18 Claims, 18 Drawing Sheets

(56) References Cited

U.S. PATENT DOCUMENTS

| | | | |
|---|---|---|---|
| 2019/0325641 | A1 | 10/2019 | Black et al. |
| 2020/0094579 | A1 | 3/2020 | Dziesietnik |

FOREIGN PATENT DOCUMENTS

| | | | |
|---|---|---|---|
| KR | 10-2021-0021929 | A | 3/2021 |
| KR | 10-2021-0082407 | A | 7/2021 |
| WO | WO 2017/142718 | A1 | 8/2017 |

OTHER PUBLICATIONS

International Search Report of PCT/KR2023/007019 mailed on Aug. 17, 2023.
Written Opinion of ISA mailed on Aug. 17, 2023.

* cited by examiner

DYNAMIC DESIGNING OF TEXTURE FOR GARMENT BY CONFIGURING MANNER OF REPEATING IMAGE

CROSS-REFERENCE TO RELATED APPLICATIONS

This application is a bypass continuation-in-part application of International PCT Application No. PCT/KR2023/007019, filed on May 23, 2023, which claims priority to Republic of Korea Patent Application No. 10-2022-0062946, filed on May 23, 2023 and Republic of Korea Patent Application No. 10-2022-0066416, filed on May 23, 2023, which are incorporated by reference herein in their entirety.

TECHNICAL FIELD

The disclosure relates to designing and generating a texture image for placing on a garment for display on a computing device.

BACKGROUND ART

Garments may feature repeating patterns or designs. In a garment simulation, these patterns or designs may be represented as textures, which are stored as data in basic units known as tiles. To enhance a garment simulation, there is a need for techniques that enable the flexible editing and generation of repeating patterns included in texture tiles.

SUMMARY

Embodiments relate to editing a texture of a garment using a configuration of repeating a texture image. A texture image is displayed on a canvas representing a two-dimensional (2D) area. The configuration of repeating the texture image on the canvas is received. Interval parameters representing a separated distance or an overlapping distance between repeated instances of the texture image on the canvas according to the received configuration are determined. The canvas with the repeated instances of texture image separated by the separated distance or overlapped by the overlapping distance according to the determined interval parameter is displayed.

In one or more embodiments, the repeated instances of the texture image on the canvas are applied to a three-dimensional (3D) representation of a garment. The repeated instances of the texture image are displayed on the 3D representation of the garment.

In one or more embodiments, an updated configuration is received. The interval parameters are updated according to the updated configuration. The repeated instances of the texture image are updated according to the updated interval parameters. The canvas as updated is dynamically displayed with the updated repeated instances of the texture image.

In one or more embodiments, the configuration includes at least one of a first iteration count or a second iteration count. The first iteration count indicates a number of times the instances of the texture image is repeated in the canvas in a first direction. The second iteration count indicates a number of times the instances of the texture image is repeated in the canvas in a second direction.

In one or more embodiments, the interval parameter is determined by determining a first interval parameter of the interval parameters by applying a size of the canvas in a first direction, a size of the texture image in the first direction, and the first iteration count to a first equation, and determining a second interval parameter of the interval parameters by applying a size of the canvas in a second direction perpendicular to the first direction, a size of the texture image in the second direction, and the second iteration count to a second equation.

In one or more embodiments, the repeated instances of the texture image extend beyond the canvas in a first direction responsive to one of the interval parameters representing a distance or overlap in the first direction being a negative number.

In one or more embodiments, a modification to the texture image is received. The interval parameters is updated to correspond to the received modification. The repeated instances of the texture image are updated according to the updated interval parameters. The canvas is dynamically displayed as updated with the updated repeating texture images.

In one or more embodiments, the modification represents a change in the size of the texture image or an orientation of the texture image.

In one or more embodiments, one or more shift parameters indicating shifting of relative locations of the repeated instances of the texture image displayed on the canvas are determined.

In one or more embodiments, the one or more shift parameters are determined by a first shift index received from a user and indicating adjustment to a degree of shifting relative locations of adjacent rows of the repeated instances in a horizontal direction; or a second shift index received from the user and indicating adjustment to a degree of shifting relative locations of adjacent columns of the repeated instances in a vertical direction.

In one or more embodiments, the one or more shift parameters are determined by: determining a first shift parameter of the one or more shift parameters by applying an iteration count in the horizontal direction, a size of the texture image in the horizontal direction, an interval parameter in the horizontal direction, and the first shift index to a first equation; or determining a second shift parameter in the vertical direction based on an iteration count in the vertical direction, a size of the texture image in the vertical direction, an interval parameter in the vertical direction, and the second shift index to a second equation.

In one or more embodiments, the first shift index is lower than an iteration count in the vertical direction. The second shift index is lower than an iteration count in the horizontal direction.

In one or more embodiments, user interface elements for moving, scaling, or rotating all of the repeated instances of the texture image on the canvas are displayed. Moved, scaled, or rotated versions of the repeated instances of the texture image are displayed in response to receiving a user input through the interface elements.

Embodiments are also related to a non-transitory computer-readable storage medium store instructions and a computing device for performing the operations as described above.

DETAILED DESCRIPTION

Figure 1:
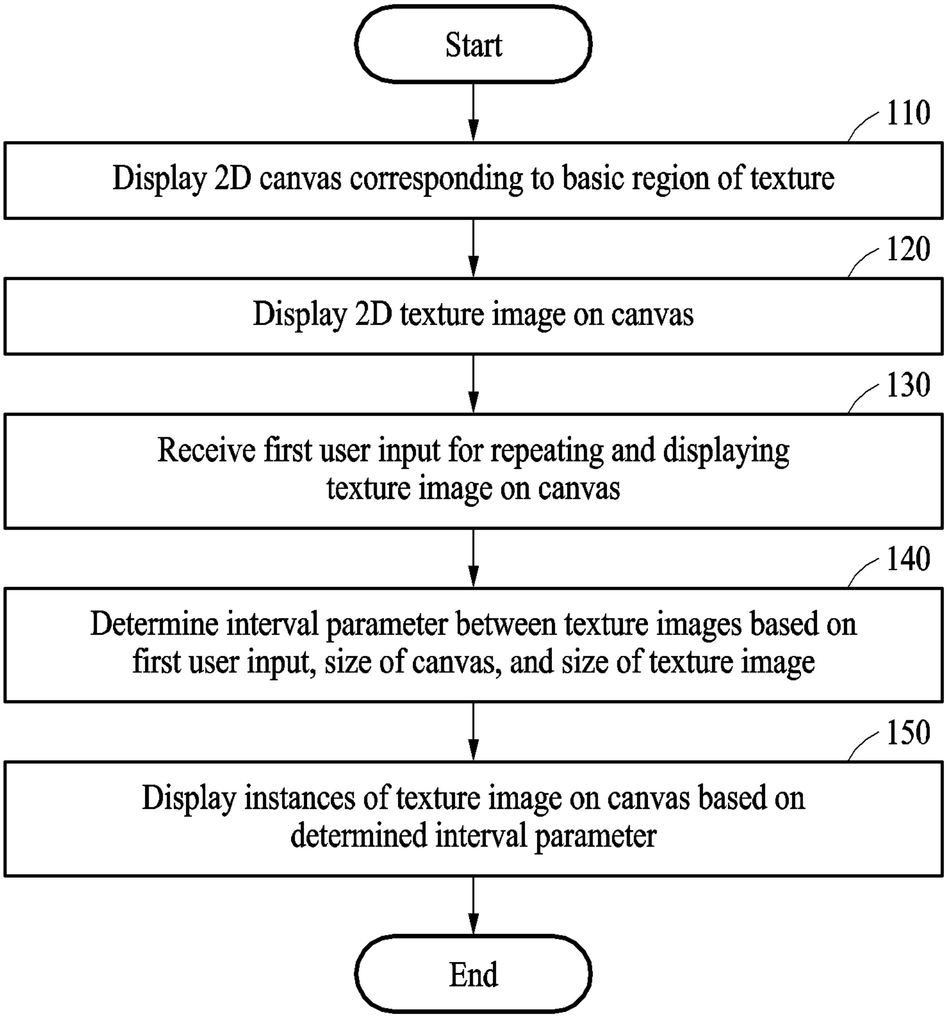
FIG. 1 is a flowchart illustrating a method of editing texture for a garment, according to an embodiment.

The specific structural or functional descriptions provided in this specification are merely examples for illustrating embodiments based on technical concepts. The embodiments may be implemented in various other forms, and are not limited to the embodiments described in this specification.

Hereinafter, embodiments will be described in detail with reference to the accompanying drawings. In the drawings, the same reference numerals refer to the same elements.

FIG. 1 is a flowchart illustrating a method for editing texture for a garment, according to an embodiment. Although operations of FIG. 1 may be performed in the illustrated order and manner therein, the order of some of the operations may change or some of the operations may be omitted, without departing from the spirit and scope of the illustrated example. The operations illustrated in FIG. 1 may be performed in parallel or simultaneously.

In operation 110, a simulation apparatus (e.g., an electronic apparatus 1700 of FIG. 17) displays a two-dimensional (2D) canvas corresponding to a basic region of a texture. The simulation apparatus may be implemented as various types of products such as a personal computer (PC), a laptop computer, a tablet computer, a smartphone, a wearable apparatus, a crowd computer, and Software as a Service (SaaS). The canvas described herein refers to a 2D area for displaying texture for a garment.

In operation 120, the simulation apparatus displays a two-dimensional (2D) texture image on the canvas. The texture image is digital data used to generate its instances that may be replicated in a certain manner, and includes, among others, a logo, a text, an illustration and a print.

In operation 130, the simulation apparatus receives a first user input for setting configuration of repeating and displaying the texture image on the canvas. The first user input may include at least one of a first iteration count indicating a number of times that the instances of the texture image is repeated in the canvas in a predetermined first direction (e.g., horizontal direction) and a second iteration count indicating a number of times the instances of the texture images are repeated in the canvas in a predetermined second direction (e.g., vertical direction).

In operation 140, the simulation apparatus determines an interval parameter between instances of the texture image on the canvas based on the first user input, the size of the canvas, and the size of the texture image. The simulation apparatus may calculate a distance between adjacent instances of texture image to evenly distribute the instances in the canvas, according to the first user input. For example, when the first iteration count is received, the simulation apparatus determines an interval parameter in the first direction based on the size of the canvas in the first direction, the size of the texture image in the first direction, and the first iteration count. In addition, when the second iteration count is received by the simulation apparatus, the simulation apparatus may determine an interval parameter in the second direction based on the size of the canvas in the second direction, the size of the texture image in the second direction, and the second iteration count.

According to an embodiment, the simulation apparatus determines whether the interval parameter is a negative number. Responsive to the determination that the interval parameter is a negative number, the simulation apparatus may expand the instances of the texture images beyond the canvas, for example, by adding instances of the texture image at both ends of the repeated instances of texture images in the canvas.

For simulating the application of a texture of a garment, the same tiles may be arranged in upward, downward, leftward, rightward, and diagonal directions according to display of the tiles in the canvas. In this case, the repetition of the instances of the texture image may be continuous in all directions. For this purpose, when the interval parameter is determined to be a negative number, the simulation apparatus may add at least one instance of the texture image at both ends of the instances of the texture image in the canvas. The number of texture image instances to be added may vary depending on the ratio between the size of the texture image and the interval parameter.

According to an embodiment, the simulation apparatus may receive a second user input for shifting locations of the repeated instances of the texture image. For example, as the texture image instances are repeated horizontally and vertically within the canvas, the repeating instances of texture image may be organized into rows and columns. In this case, the simulation apparatus may shift vertical locations, horizontal locations or both vertical and horizontal locations of adjacent columns, rows or both the adjacent columns and rows.

The simulation apparatus may determine a shift parameter of the pattern based on the first user input, the second user input, the size of the texture image, and the interval parameter. The simulation apparatus may divide a basic distance of the repeating pattern, which is defined by the size of the texture image and the interval parameter, based on an iteration count according to the first user input and shift the starting point of an instance of the texture image for the next row or column by a divided distance specified by the second user input.

The second user input may include at least one of a first shift index indicating adjustment to a degree of shifting relative locations of adjacent rows of repeated instances in the predetermined first direction and a second shift index indicating adjustment to a degree of shifting relative locations of adjacent columns of repeated instances in the predetermined second direction. The first shift index may be less than an iteration count in the second direction included in the first user input. The second shift index may be set less than an iteration count in the first direction included in the first user input.

For example, when the first shift index is received by the simulation apparatus, the simulation apparatus may determine a shift parameter in the first direction based on the iteration count in the second direction included in the first user input, the size of the texture image in the first direction, the interval parameter in the first direction, and the first shift index. Alternatively, when the second shift index is received, the simulation apparatus may determine a shift parameter in the second direction based on the iteration count in the first direction included in the first user input, the size of the texture image in the second direction, the interval parameter in the second direction, and the second shift index.

FIGS. 11 through 15 are diagrams illustrating displaying of repeated instances of textile image with their locations shifted, according to an embodiment. According to an embodiment, the simulation apparatus may receive an input for modifying the size of the texture image displayed on the canvas. The simulation apparatus may update the interval parameter based on the modified size. Alternatively, the simulation apparatus may receive an input for rotating the texture image displayed on the canvas. The simulation apparatus may modify the size of the rotated texture image. The simulation apparatus may update the interval parameter based on the modified size.

In operation 150, the simulation apparatus displays repeated instances of the texture image on the canvas based on the determined interval parameter. The simulation apparatus may display instances of the texture image on the canvas based on the determined interval parameter and/or the determined shift parameter.

The simulation apparatus according to an embodiment may apply a texture to the canvas to a 3D garment and display the 3D garment applied with the texture. The simulation apparatus may display a graphical user interface for editing a texture on the canvas in one region of a display and display a result of simulating a 3D garment with the texture of the canvas applied in another region of the display. In addition, when texture editing through the canvas is performed in the one region of the display by a selection input received from the user, the simulation apparatus may dynamically display in real time the result of editing the texture on the 3D garment displayed in the other region of the display.

The simulation apparatus may display graphical user interface elements for moving, scaling and/or rotating the entire repeating instances of the texture image pattern in the canvas. The simulation apparatus may move, scale, and/or rotate the entire repeating instances of the texture image responsive to a user input received through the graphical user interface elements, and display the modified repeated instances of the image pattern.

When an individual texture image is edited (e.g., moved, scaled, or rotated), the simulation apparatus may update the repeated instances by updating the interval parameter and/or the shift parameter. On the other hand, when an editing input is received through the graphical user interface elements, the simulation apparatus may treat a predetermined repeating instances as a single texture image and edit (e.g., move, scale, or rotate) the entire repeated instances of the texture image instead of modifying an individual texture image.

Figure 2:
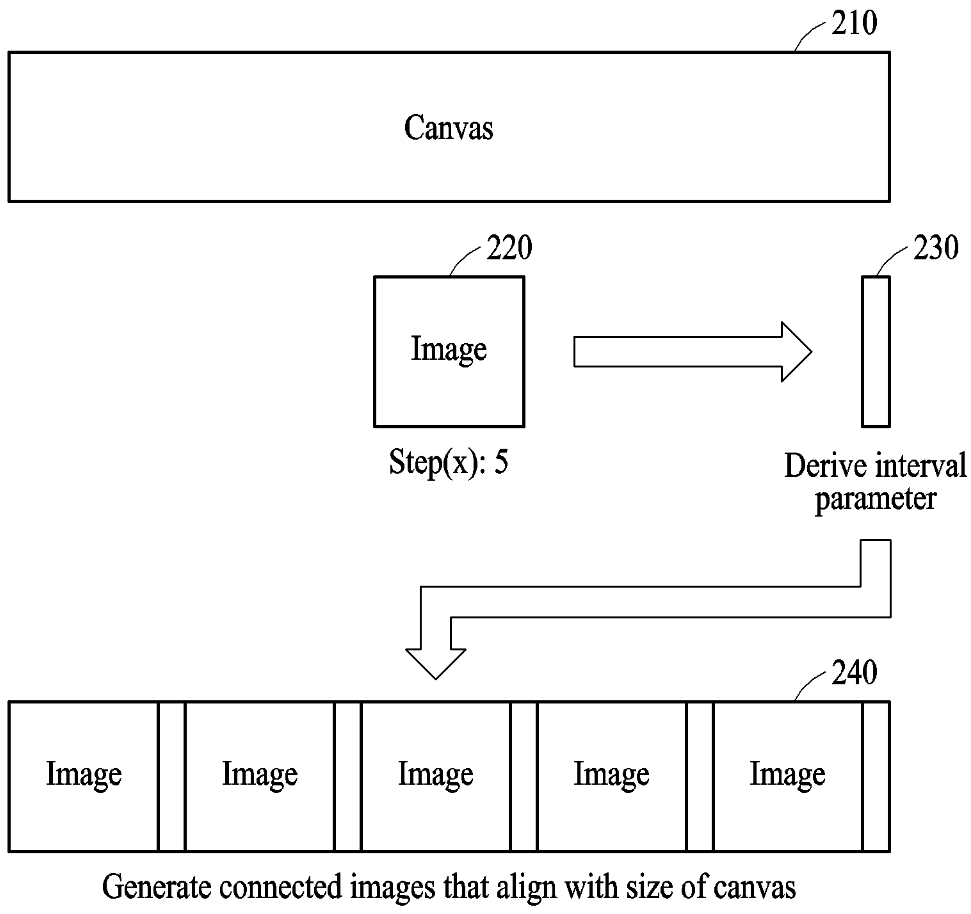
FIG. 2 is a conceptual diagram illustrating repeating instances of a texture image, according to an embodiment.

FIG. 2 is a conceptual diagram illustrating repeating instances of a texture image, according to an embodiment. The description overlapping with FIG. 1 is omitted herein for the sake of brevity. Referring to FIG. 2, a processor 1710 (shown in FIG. 17) may generate a virtual construct of a canvas 210, a texture image 220 (hereinafter referred to as "the image 220"), and an image 240 applied with an iteration count. In addition, the processor 1710 may derive an interval parameter 230 based on a first user input.

The processor 1710 may set a first direction as an x-axis direction and a second direction as a y-axis direction. The first user input may include a first iteration count (Step(x)) and a second iteration count (Step(y)). Step(x) is the number of instances of images 220 that are repeated in a single row (x-axis), and Step(y) is the number of the instances of images 220 that are repeated in a single column (y-axis). For example, Step(x) of 5 indicates that a texture image such as the image 220 is repeated five times in the x-axis direction in canvas 210 (meaning that the image is 220 repeated five times in a single row). In another example, Step(y) of 5 indicates that the image such as the image 220 is repeated five times in the y-axis direction in canvas 210 (meaning that the image is repeated five times in a single column).

The processor 1710 may determine an interval parameter in the first direction (x-axis direction) according to Equation 1 below:

$$\frac{\text{Width of Canvas} - (\text{Width of image} \times \text{First iteration count})}{\text{First iteration count}} \quad \text{Equation 1}$$

The processor 1710 may determine an interval parameter in the second direction (y-axis direction) according to Equation 2 below:

$$\frac{\text{Height of Canvas} - (\text{Height of image} \times \text{Second iteration count})}{\text{Second iteration count}} \quad \text{Equation 2}$$

The processor 1710 may receive an input according to the first user input to repeat the image 220 in the first direction (x-axis direction). When the first user input of 5 is received as Step(x), the processor 1710 may determine the interval parameter 230 in the first direction based on the first user input, the size of the canvas, and the size of the texture image. Specifically, the processor 1710 determines that the image 220 is to be repeated five times in the x-axis direction (Step(x): 5). Assuming that the width of the canvas in the x-axis direction is 20 and the width of the image 220 in the x-axis direction) is 3, applying these values to Equation 1 yields [20−(3*5)]/5=1. Thus, the interval parameter in the first direction is 1. The same process may be applied to repeating of the image in the y-axis direction (Step(y)) using Equation 2.

After determining the interval parameter 230, the processor 1710 may generate instances of the image 240 to which the iteration count is applied. The locations of instances of the image 220 are determined by applying the interval parameter to the right side of the instances. Alternatively, the interval parameter may be applied to the left side of the image instances instead. In addition, the embodiment illustrated in FIG. 2 represents the instances of the image placed using only Step(x), but instances of the image may be replicated and placed in the vertical direction according to Step(y) as well.

Figure 3:
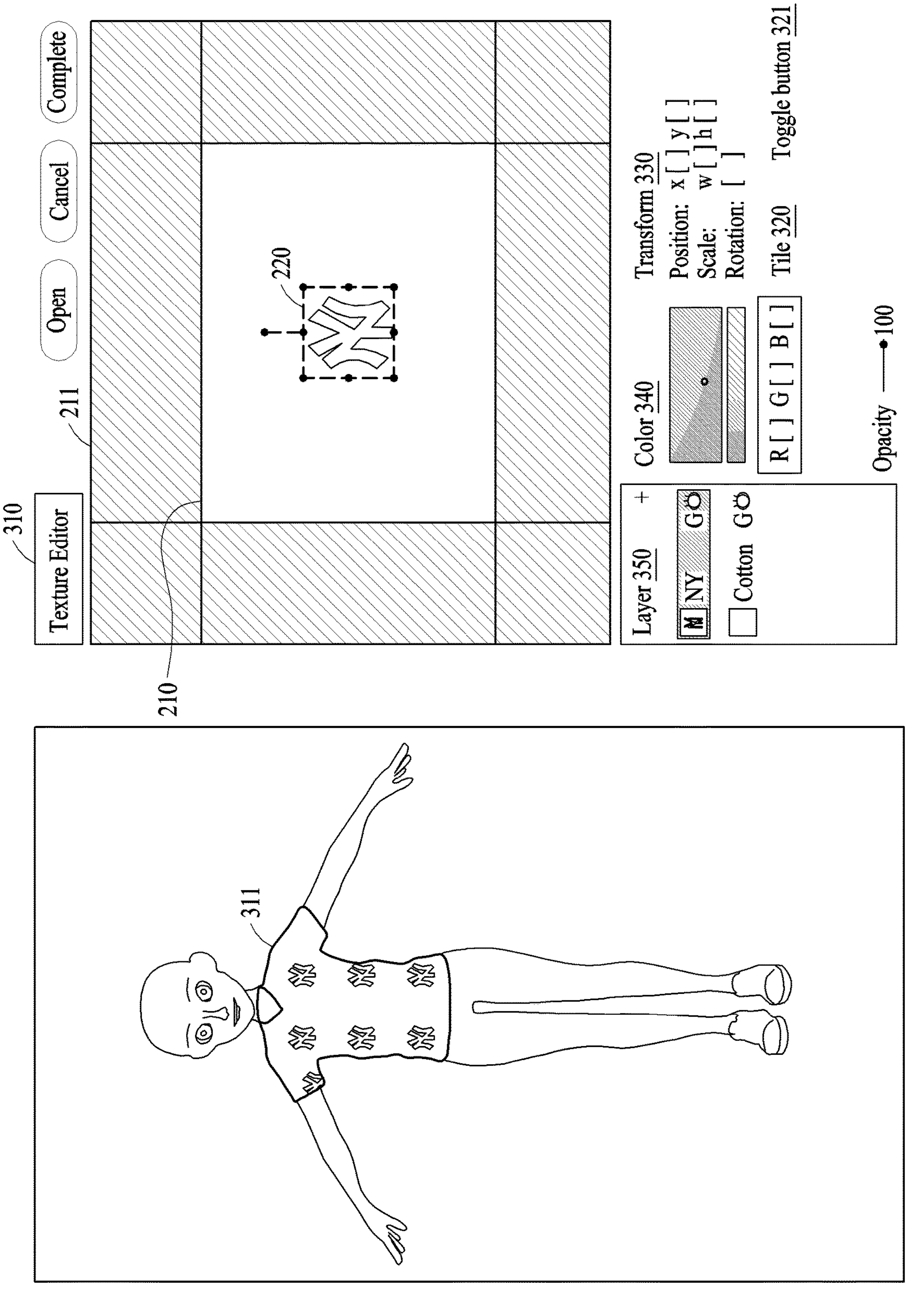
FIGS. 3 through 5 diagrams illustrating graphical user interfaces associated with displaying of repeated instances of a texture image is repeated, according to an embodiment.
Figure 4:
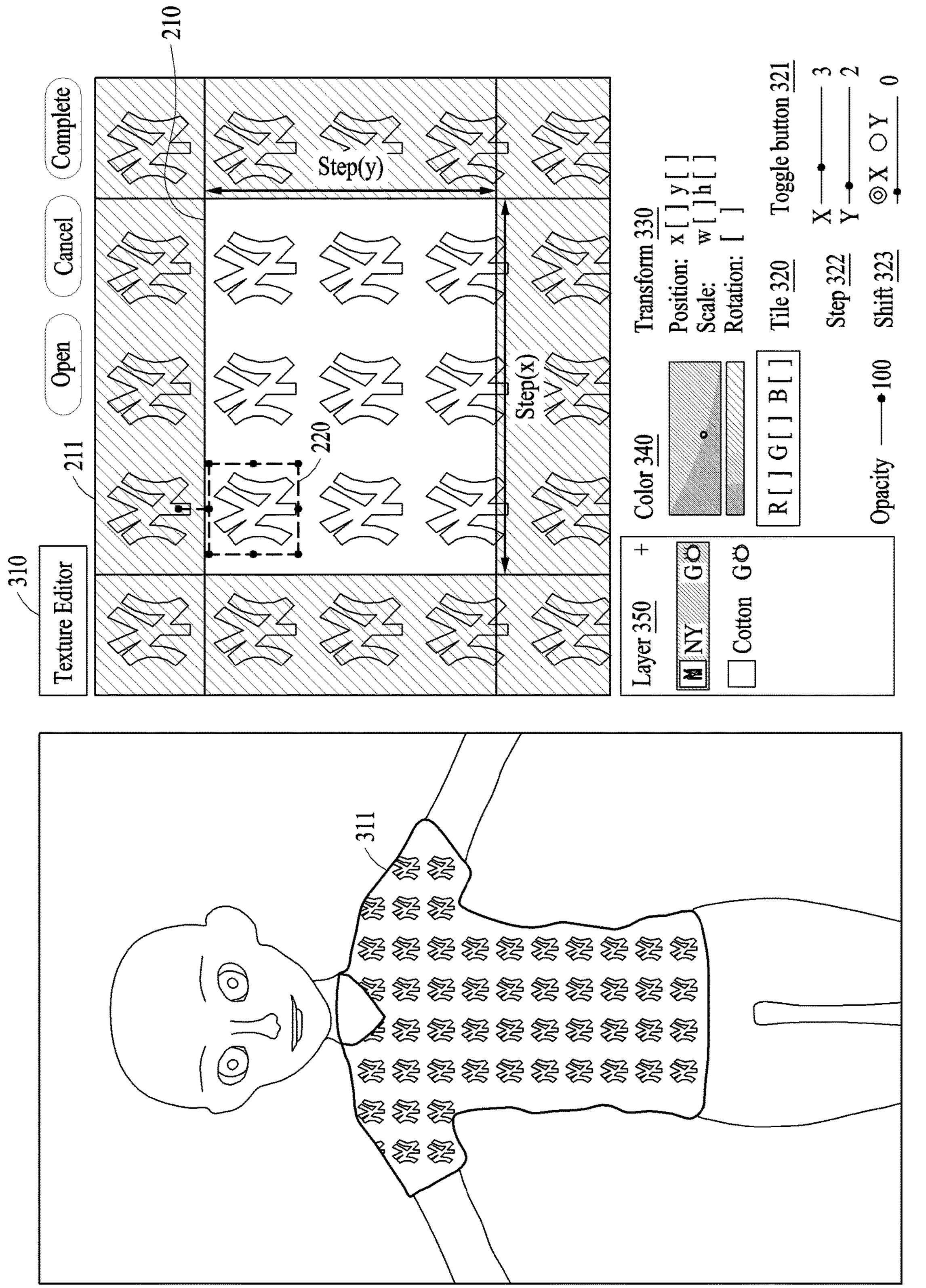
Figure 5:
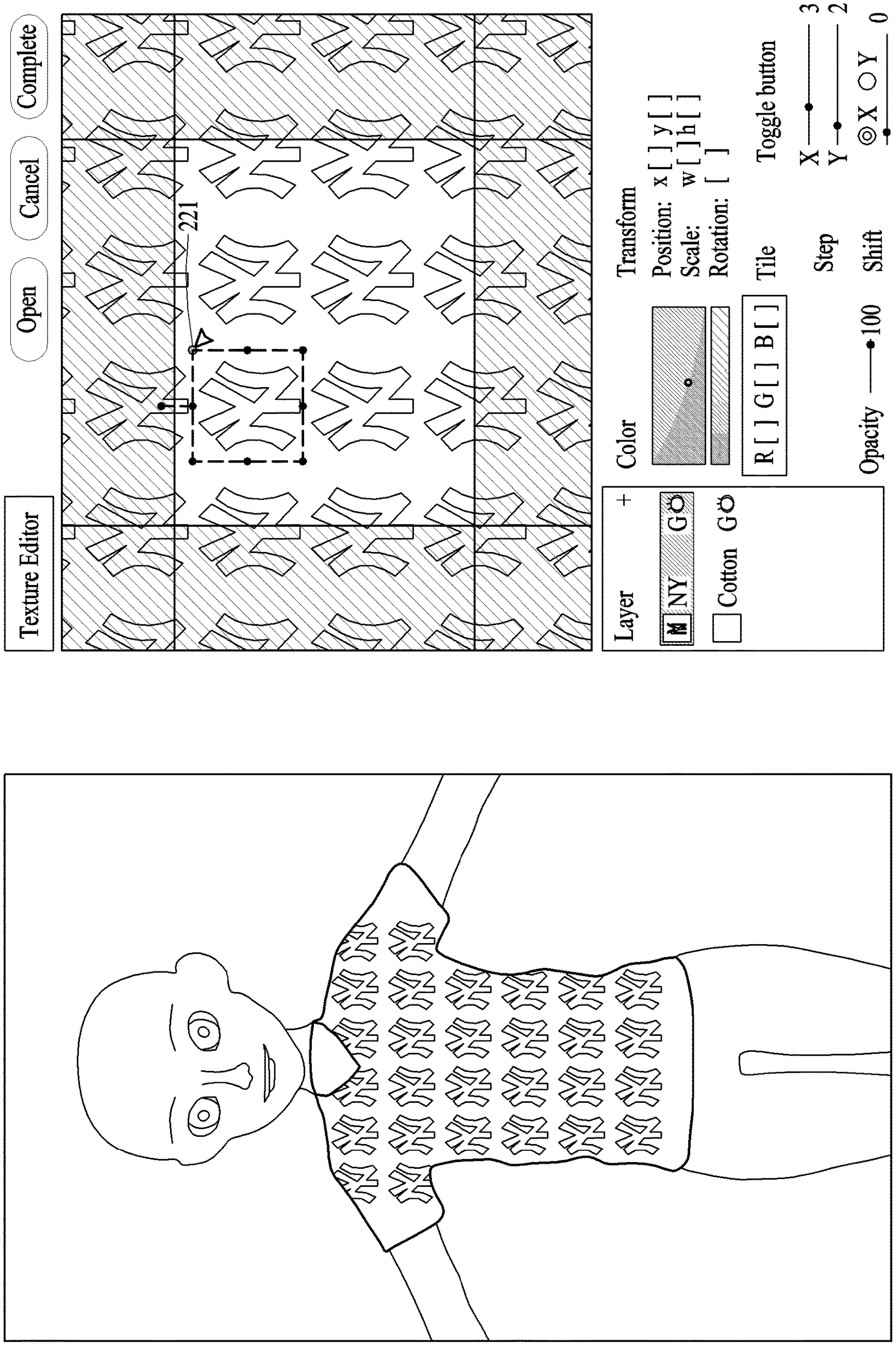

FIGS. 3 through 5 diagrams illustrating graphical user interfaces associated with displaying of repeated instances of a texture image is repeated, according to an embodiment. The description overlapping with FIGS. 1 and 2 are omitted herein for the sake of brevity. The same reference numerals of FIGS. 1 and 2 are applicable to FIGS. 3 through 5. Referring to FIGS. 3 to 5, the processor 1710 causes display of a texture editor 310 on a screen 300. The texture editor

310 may include the canvas 210, the image 220, and a tile function 320. According to an embodiment, the texture editor 310 may further include one or more of graphical user interface elements 330, 340, 350 corresponding transform function, color function, and layer function. Furthermore, the texture editor 310 may provide an expanded canvas 211 that shows a portion extending beyond the size of the canvas 210 where the size of the canvas is set by a user.

The processor 1710 may run a simulation by applying a texture modified by the texture editor 310 to a 3D garment 311. Referring to FIG. 3 in conjunction with FIG. 4, the processor 1710 may receive a selection input of the user for a toggle button 321 of a user interface element 320 indicating the tile function and display user interface elements 322 and 323 corresponding to Step function and Shift function, respectively, on the texture editor. When the toggle button 321 is activated, the image 220 is used a tile to replicate its instances across the canvas 210 and/or expanded canvas 211. When the toggle button 321 is deactivated, only a single instance of the image 220 is displayed on the canvas 210 and/or expanded canvas 211. However, the display of user interface elements 322 and 323 does not need to be toggled based on the input of the toggle button 321, and these user interface elements may remain active on the screen.

Referring to FIGS. 4 and 5, the user interface element 322 indicating the Step function may display Step(x) corresponding to a user's input for a first iteration count in a horizontal direction and Step(y) corresponding to user's input for a second iteration count in a vertical direction. For example, when the processor 1710 receives an input of 3 for Step(x) and 3 for Step(y) with respect to the image 220 displayed on the canvas 210, the first iteration count is 3 and the second iteration count is 3. The processor 1710 may determine a first interval parameter and a second interval parameter based on the received first iteration count and second iteration count. When the first interval parameter and the second interval parameter are determined, as illustrated in FIG. 5, the processor 1710 may display, in the canvas 210, instances of the image 220 repeated according to the iteration count. In addition, the processor 1710 may display additional instances of image 220 in expanded canvas 211. The details of Shift function is described in detail below with reference to FIGS. 11 through 15. The Transform function is described in detail below with reference to FIG. 16.

A user interface element 340 indicating Color function is used for adjusting the color and/or opacity of the instances of image 220. The color of image 220 may be adjusted by inserting red, green, blue, (RGB) values on the user interface or picking a location in a color map or color wheel that corresponds to a combination of RGB values. The opacity of the image 220 may be adjusted by selecting an opacity value (e.g., a value in the range of 0 to 100).

A user interface element 350 corresponding to Layer function enables a user to add a list of images to the canvas 210 in an overlapping manner. The user interface element 350 may enable a layer of image to be displayed or hidden from the canvas 210.

Various modifications to the image 220 may be performed by a user. Referring to FIG. 5, for example, the processor 1710 may expand or reduce the size of the image 220 according to a user's manipulation of a bounding box of the image 220 using a pointer 221. When the size of the image 220 is modified, the processor 1710 may update an interval parameter based on the modified size of the image 220. Based on the updated interval parameter, the processor 1710 may update and display the repeated instances of the updated image 220 on the canvas 210.

According to an embodiment, the processor 1710 may display repeated instances of the image 220 by placing them on locations adjusted by, for example, a user input. The instances of the image 220 may be repeated vertically and horizontally with their locations changed according to the user input. In some cases, a portion of repeated instances of the image 220 at the boundary of the canvas is cropped. The processor 1710 may place the portion of the instance of the image 220 cropped at one boundary of the canvas at another boundary of the canvas, thereby ensuring the continuity of the repeated instances of the images between the canvas and the expanded canvas.

The arrangement of the canvas 210, the image 220, and user interface elements associated with various functions in the figures are merely illustrative and not limiting.

Figure 6:
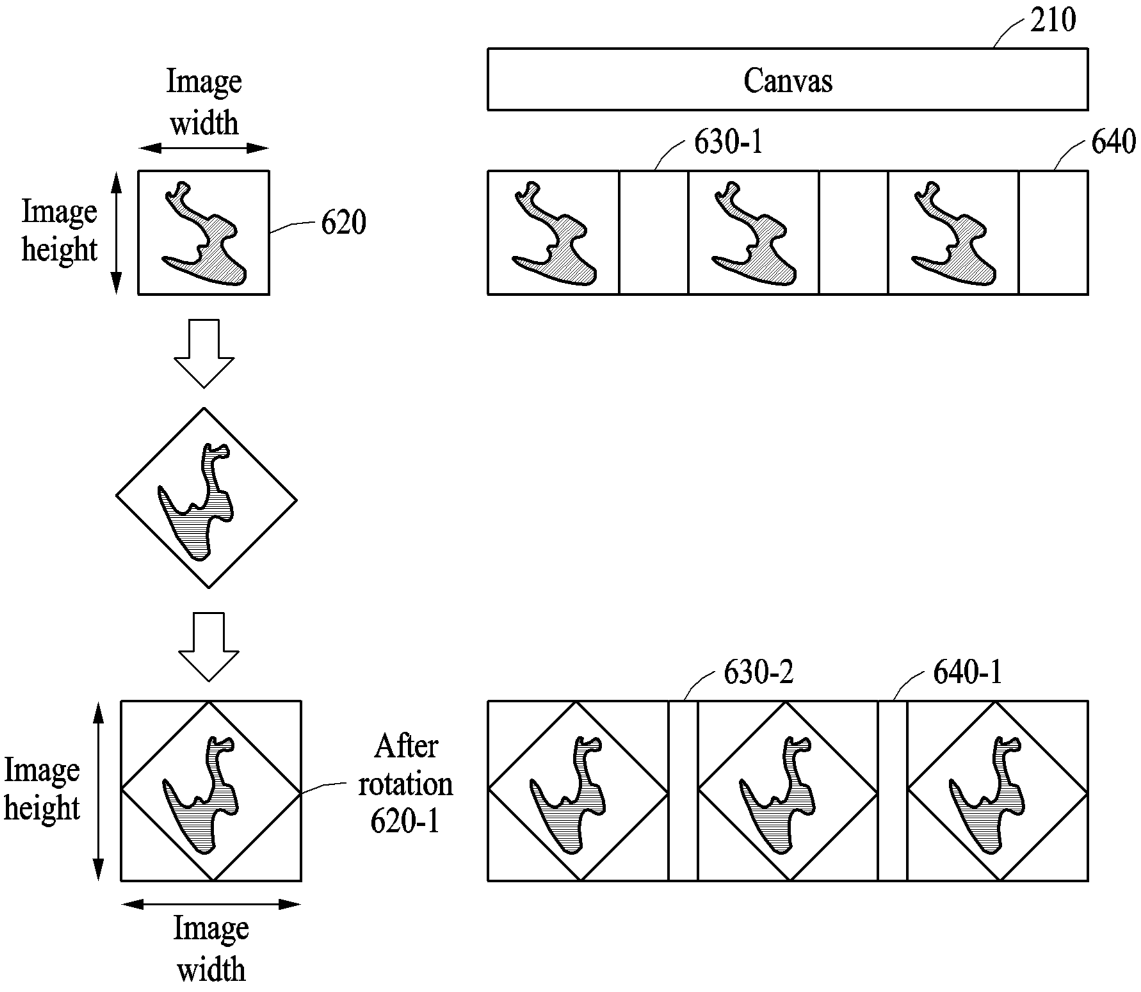
FIGS. 6 and 7 are conceptual diagrams illustrating rotating of the texture image, according to an embodiment.
Figure 7:
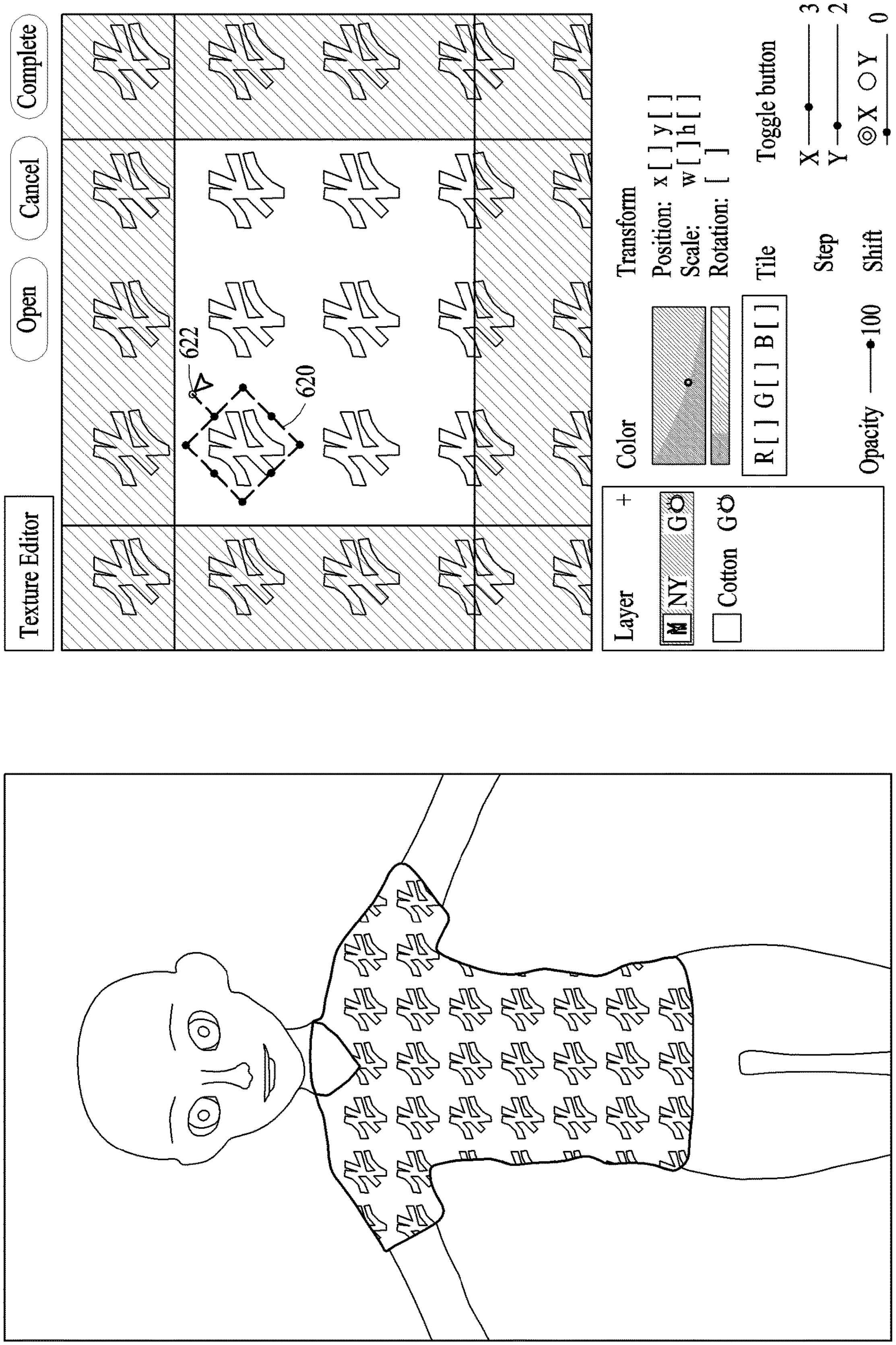

FIGS. 6 and 7 are conceptual diagrams illustrating rotating of the texture image, according to an embodiment. Referring to FIGS. 6 and 7, the processor 1710 may receive a selection input of a user for a rotation pointer 622 included in a bounding box of an image 620 (e.g., the image 220 of FIGS. 2 to 5). The processor 1710 may display a rotated image 620-1 on the canvas 210 based on a corresponding input of the user. The processor 1710 may display an image 640 applied with a pre-existing iteration count before rotation is applied to the image 640. Once the image 640 is rotated, the processor 1710 may update the image size to correspond to the rotated image 620-1. The width and the height of an image may be defined as the horizontal length and vertical length of the image, respectively. The width and the height of the rotated image 620-1 may be larger than those of unrotated image 620, as shown in FIG. 6. Accordingly, the processor 1710 may update interval parameters 630 based on the updated width and updated height of the rotated image 620-1. The processor 1710 may place repeating instances of the image 640-1 applied with the iteration count based on an updated interval parameter 630-1.

Figure 8:
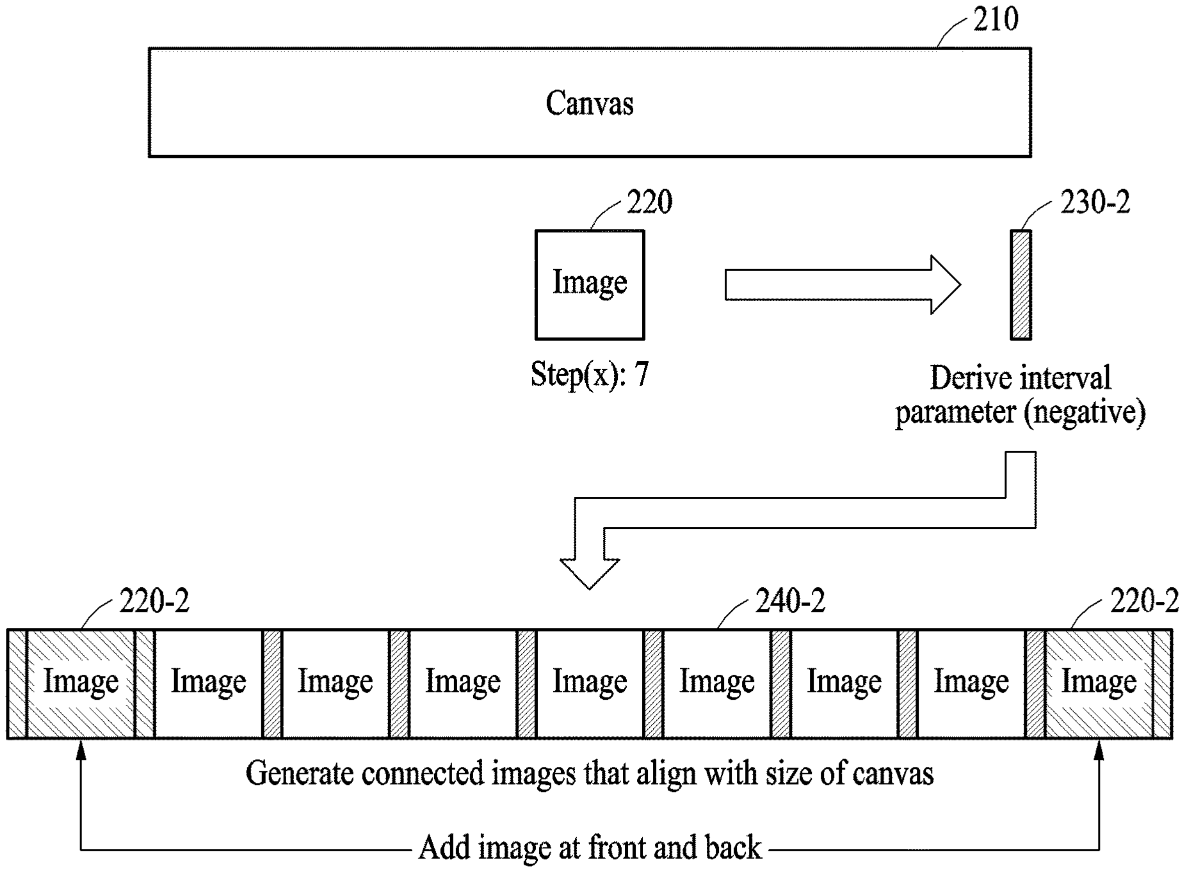
FIGS. 8 through 10 are diagrams illustrating displaying of repeated instances of a textile image when an interval parameter is negative, according to an embodiment.
Figure 9:
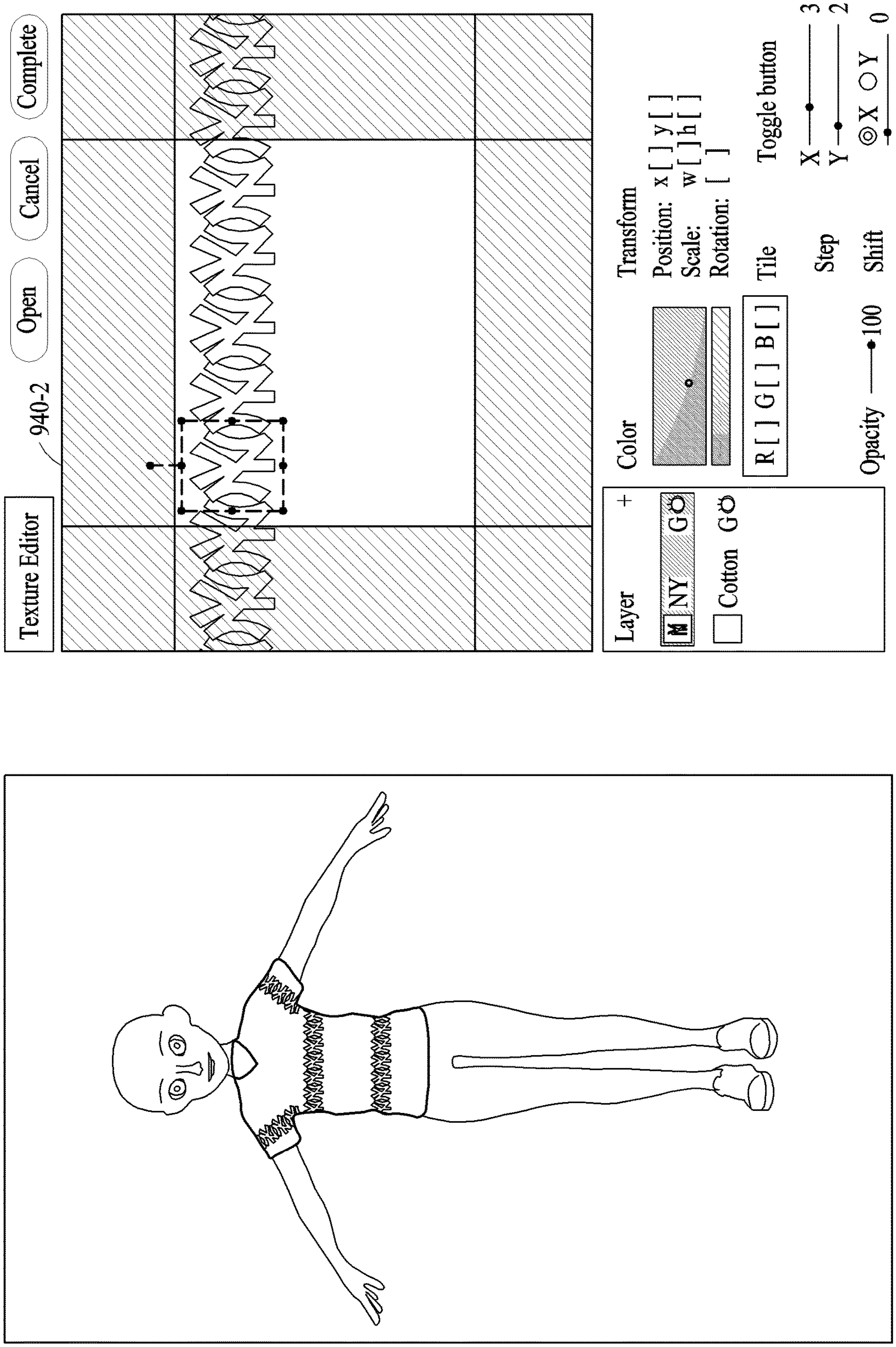
Figure 10:
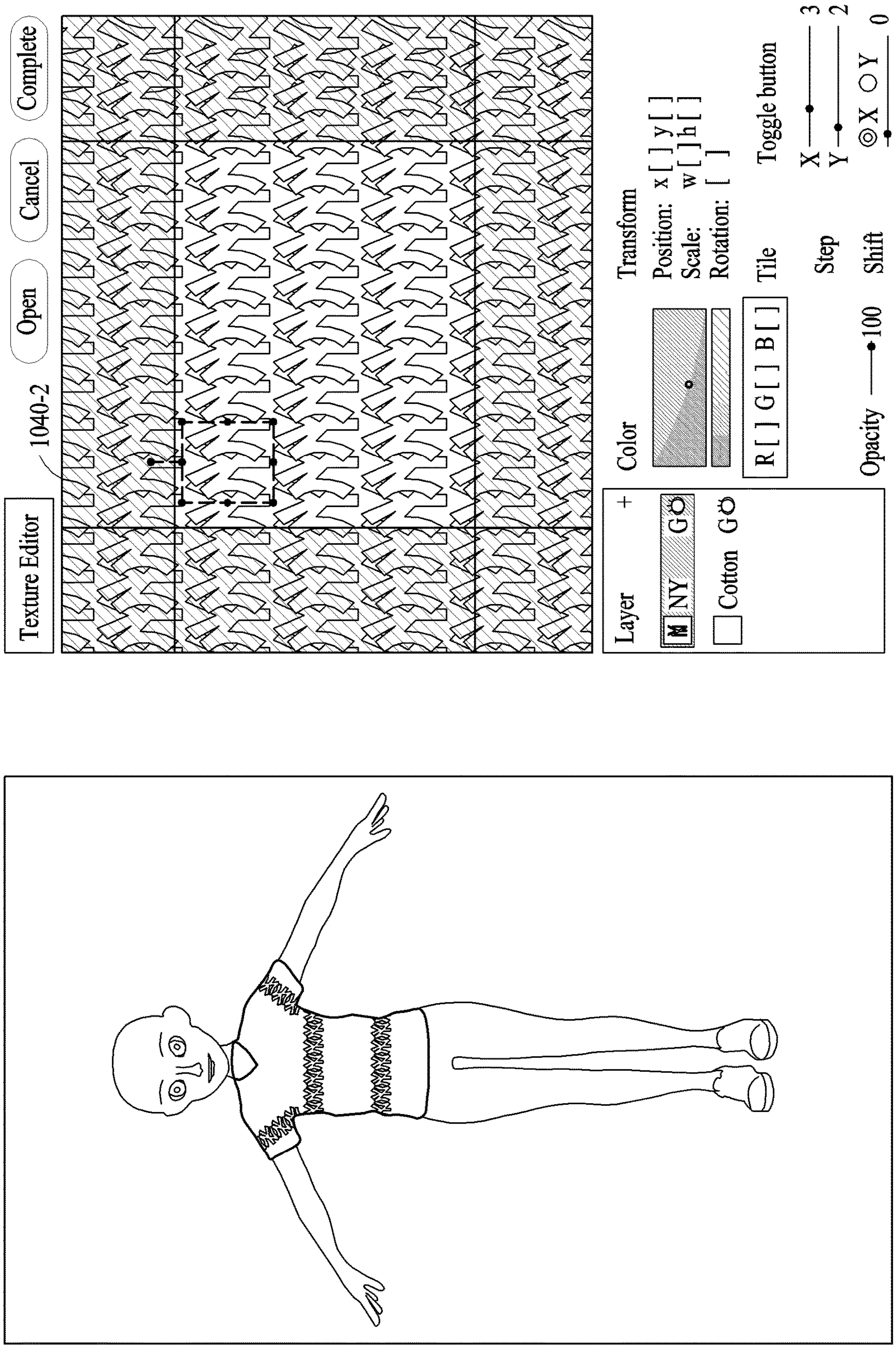

FIGS. 8 through 10 are diagrams illustrating displaying of repeated instances of a textile image when an interval parameter is negative, according to an embodiment. The descriptions provided above with reference to FIGS. 1 through 5 are omitted herein for the sake of brevity. Referring to FIG. 8, the processor 1710 may display an image 240-2 applied with an iteration count when an interval parameter 230-2 is determined to be a negative number. The negative number of the interval parameter 230-2 indicates that the instances of the image overlap at their edges. When the interval parameter 230-2 is negative, the image 220 may be truncated at the boundary of the canvas 210. In this case, the processor 1710 may add instances 220-2 of the image 220 to both ends of the image 240-2 so that image 240-2 expands beyond the canvas 210. The processor 1710 may generate the image 240-2 applied with the iteration count by adding the instances 220-2 of the image 220 to both ends of the image 240-2. The number of instances 220-2 of the image 220 to be added may be determined using the following equation 3:

$$\text{(Natural number)}[\text{Image size}/(\text{Image size}+\text{interval parameter})] \quad \text{Equation 3}$$

A (Natural number) operation refers to a decimal round down operation that takes only the integer part of a calculated value by rounding down the number. The size of an image may be one of the width of the image and the height of the image. For example, when determining an interval parameter in a first direction (x-axis direction), the size of the image may represent the width of the image. Similarly, when determining an interval parameter in a second direction (y-axis direction), the size of the image may represent the height of the image.

For example, it is assumed that the width of the canvas 210 is 21 and the width of the image is 4. In this case, the processor 1710 may determine that the interval parameter in the first direction is −1 according to Equation 1 described above. Furthermore, the number of images to be added as calculated according to Equation 3 is 1, and thus, the processor 1710 may add one image 220 to each end of the image 240-2 When the interval parameter in the first direction is determined to be a negative number, the processor 1710 may generate the image 240-2 applied with the iteration count, with overlapping portions between the instances of the image 220.

According to another embodiment, when the interval parameter 230-2 is determined to be a positive number, the image 220 may be truncated at the boundary of the canvas 210. The positive number of the interval parameter 230-2 indicates that the instances of the image 220 are separated by a distance. In this case, the processor 1710 may add instances 220-2 of the image 220 to both ends of the image 240-2. The processor 1710 may generate the image 240-2 applied with the iteration count by adding the instances 220-2 of the image 220 to the image 240-2. The processor 1710 may determine the number of instances of the images 220 to be added at both ends of the image 240-2 using following Equation 4:

(Natural number)[Image size/(Image size+interval parameter)] Equation 4 where the (natural number) operation, contrary to Equation 3 above, refers to a decimal round up operation that rounds up a number to an integer.

According to an embodiment, the operations as described with reference to FIG. 9 may be performed when the interval parameter 230-2 is either a positive number or a negative number. The processor 1710 may adjust the number of images to prevent truncation of the instance of the image 220 at the boundary of the canvas 210. For this purpose, the number of instances of the image may be increased when the interval parameter 230-2 is a positive number or negative number. The processor 1710 may increase the number of instances of images 220 in both directions for an arbitrary image 220.

Referring to FIG. 9, the processor 1710 may display an image 940-2 applied with the first iteration count in the first direction (x-axis direction) on the canvas 210. Referring to FIG. 10, the processor 1710 may display, on the canvas 210, an image 1040-2 applied with the first iteration count in the first direction (x-axis direction) and the second iteration count in the second direction (y-axis direction).

Figure 11:
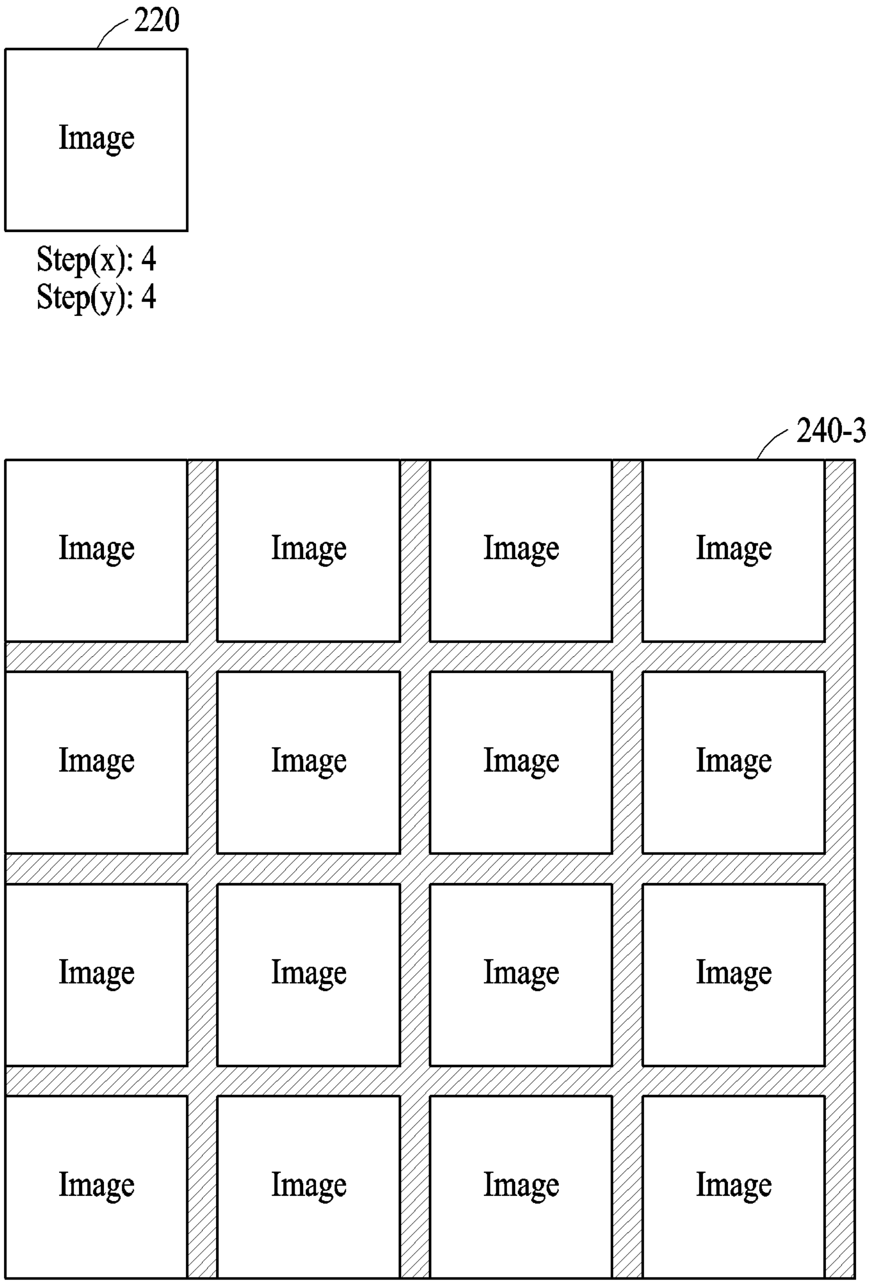
FIGS. 11 through 15 are diagrams illustrating displaying of repeated instances of textile image with their locations shifted, according to an embodiment.

FIGS. 11 through 15 are diagrams illustrating displaying of repeated instances of textile image with their locations shifted, according to an embodiment. Referring to FIG. 11, the processor 1710 may receive a first user input (e.g., through user interface element 322) and display, on the canvas 210, the image 240-3 applied with the iteration count of four iterations in a first direction (Step(x): 4) and four iterations in a second direction (Step(y): 4) of instances of the image 220.

In a texture, the instances of the image 220 may be repeated in the first direction or second direction. In this case, repeated instances may be organized into rows, columns or both. In garment designs, there are some cases where image instances are aligned along rows and columns. But in other cases, image instances may not be aligned along rows and columns but shifted by certain distances in a vertical direction, a horizontal direction or both. By shifting the locations of the image instances, such misalignment may be implemented. Shifting refers to an action of moving a row or column by a predetermined interval in a predetermined direction. For example, first direction shifting refers to an action of moving relative locations of each row of instances by a predetermined interval in the first direction. In another example, second direction shifting refers to an action of moving relative locations of column by a predetermined interval in the second direction. In other words, shifting corners or centers of instances of the texture image in different rows or columns such that the corners or centers are displaced, creating a visual effect that the instances of the texture image are interlaced.

Subsequently, the processor 1710 may receive a second user input for shifting repeating instances of the image 220. The processor 1710 may determine shift parameters of the repeating instances of the image 220 based on the first user input, the second user input, the size of the image, and an interval parameter. The shift parameters may include a shift parameter in a first direction (x-axis direction) and a shift parameter in a second direction (y-axis direction).

The second user input may include at least one of a first shift index indicating adjustment to the degree of shifting relative locations of adjacent rows of repeated instances in the canvas in the first direction (e.g., a horizontal direction) and a second shift index indicating adjustment to the degree of shifting relative locations of adjacent columns of the repeated instances in the canvas in the second direction (e.g., a vertical direction). The processor 1710 may limit the first shift index to be less than or equal to an iteration count in the second direction and limit the second shift index to be less than or equal to an iteration count in the first direction.

The first shift index may be represented as Shift (x) and the second shift index may be represented as Shift (y). The processor 1710 may determine shift parameters according to following Equations 4 and 5:

X-Shift pixel value ={(Image width+interval parameter)/Number of Y-Steps}*X-Shift value Equation 4

Y-Shift pixel value =((Image height+interval parameter)/Number of X-Steps)*Y-Shift value Equation 5

In Equations 4 and 5, X-shift denotes a shift in the first direction (x-axis direction), Y-shift denotes a shift in the second direction (y-axis direction), Number of X-steps denotes a first iteration count, Number of Y-steps denotes a second iteration count, X-shift pixel value denotes a first shift parameter, Y-shift pixel value denotes a second shift parameter, X-shift value denotes the first shift index, and Y-shift denotes the second shift index.

Figure 12:
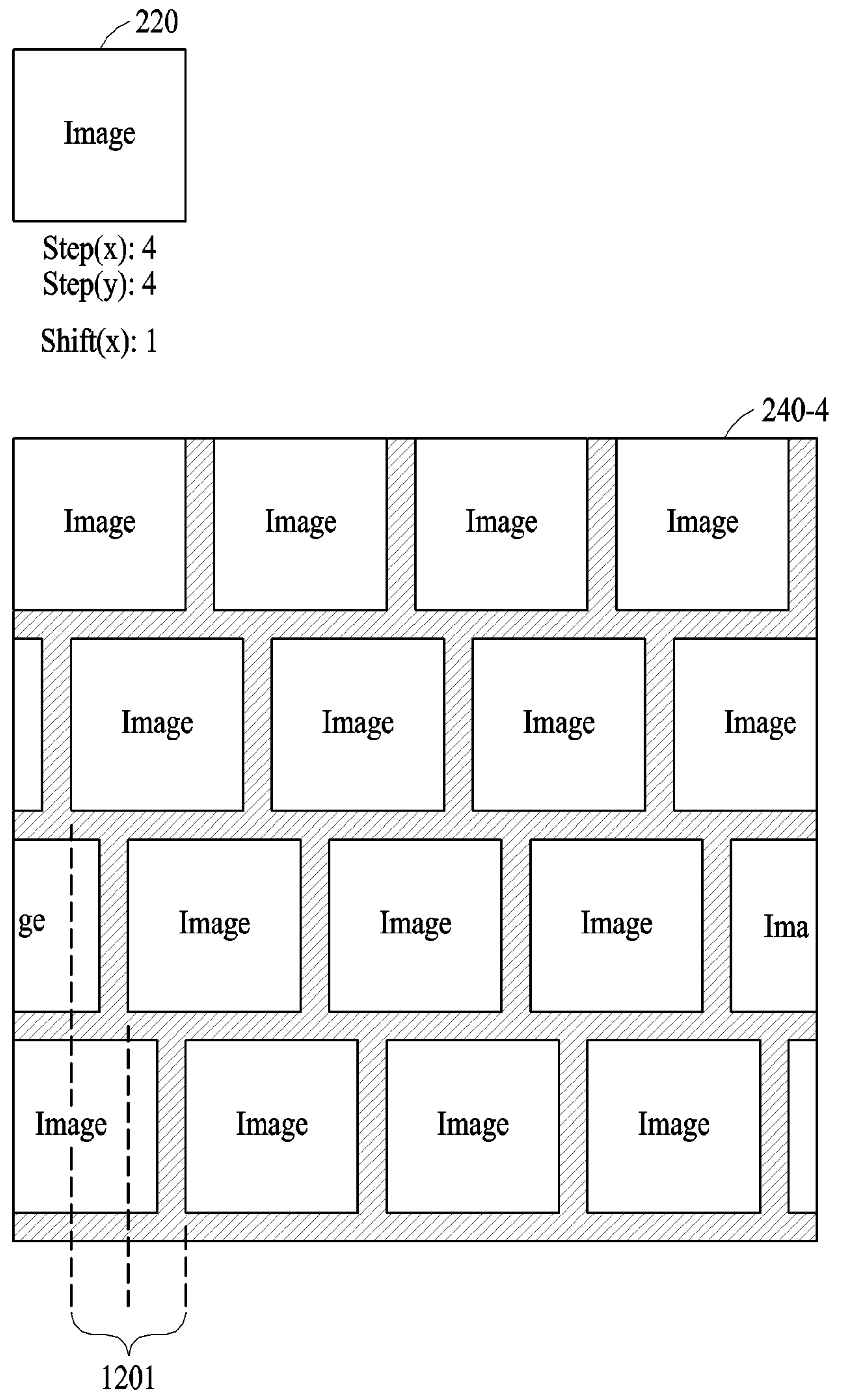

For example, in FIG. 12, it is assumed that the width of the canvas 210 is 20, the width of the image is 3, the first iteration count is 4, and the second iteration count is 4. In this case, the processor 1710 may determine that an interval parameter is 2. After an image applied with an iteration count is generated, the processor 1710 receives an input with the first shift index of 1 (Shift (x): 1) according to the second user input. By applying Equation 4, the processor 1710 may determine that the first shift parameter (X-shift pixel value) is 1.5. When the first shift parameter is determined, the processor 1710 may generate an image 240-4 applied with the shifting according to a first shift base 1201 based on the first shift parameter. The image 240-4 applied with the shifting may be derived from the image 240-3 applied with the iteration count by moving a second row by 1.5 in the x-axis direction, a third row by 3 in the x-axis direction, and a fourth row by 4.5.

Figure 13:
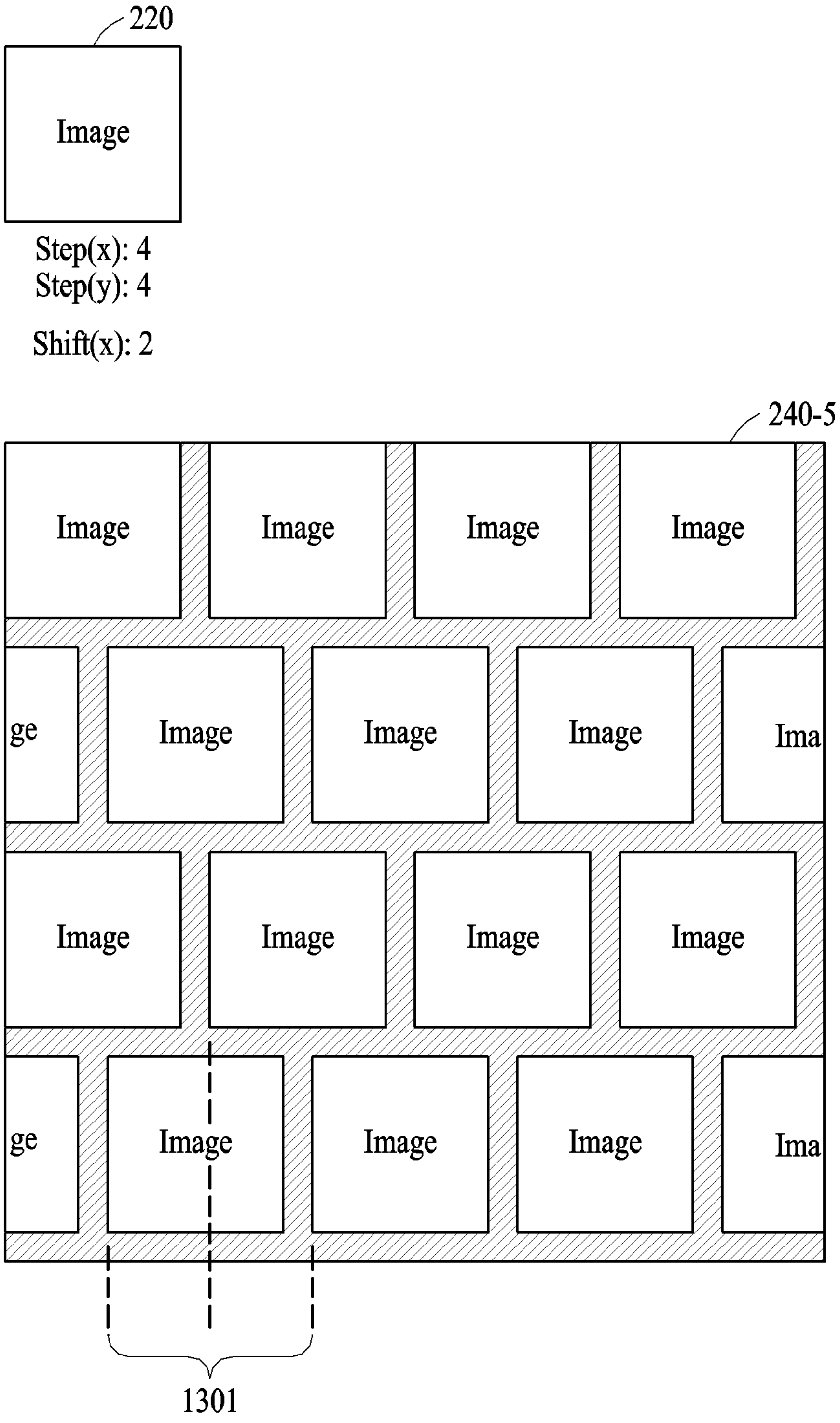

Similar to FIG. 12, in the example of FIG. 13 also assumes that the width of the canvas 210 is 20, the width of the image is 3, the first iteration count is 4, and the second iteration count is 4. In this case, the processor 1710 may determine that an interval parameter is 2. After the image applied with the iteration count is generated, the processor 1710 receives an input with the first shift index of 2 (Shift (x): 2) according to the second user input. By applying Equation 4, the processor 1710 may determine that the first shift parameter (X-shift pixel value) is 3. When the first shift parameter is determined, the processor 1710 may generate e an image 240-5 applied with the shifting according to a first shift base 1301 based on the first shift parameter. The image 240-5 applied with the shifting of an image derived from the image 240-3 applied with the iteration count by moving the second row by 3 in the x-axis direction, the third row by 6 in the x-axis direction, and the fourth row by 9.

The above-described examples are provided on the assumption that a shift is made in a positive (right) direction along the x-axis, but the examples are not limited as such and the shift may also be a negative (left) direction along the x-axis. Furthermore, the processor 1710 may perform a shift in the second direction (in the y-axis direction) by applying the above-described examples in the same manner but in the y-axis direction.

When generating images (e.g., 240-4 or 240-5) applied with shifting, the processor 1710 may prevent truncation of instances of the image by adding image instances to both ends of the images in a corresponding direction (first direction or second direction) based on an iteration count (first iteration count or second iteration count). Moreover, when the first user input (input for an iteration count) changes in an image to which a shift is applied, the processor 1710 may keep the second user input unchanged if the second user input is less than the first user input, and the processor 1710 may set the second user input to be less than the first user input if the second user input is greater than the first user input.

A policy of automatically decreasing a shift index in response to a corresponding decrease in an iteration count may be set in various ways. For example, if a shift index in the first direction is 4 and the iteration count in the second direction changes from 5 to 3, the processor 1710 may set the shift index in the first direction to 3 since the shift index in the first direction needs to be less than or equal to the iteration count in the second direction. Alternatively, in the same scenario, the processor 1710 may also set the shift index in the first direction to 2, which is a value less than the allowable maximum value of 3.

Figure 14:
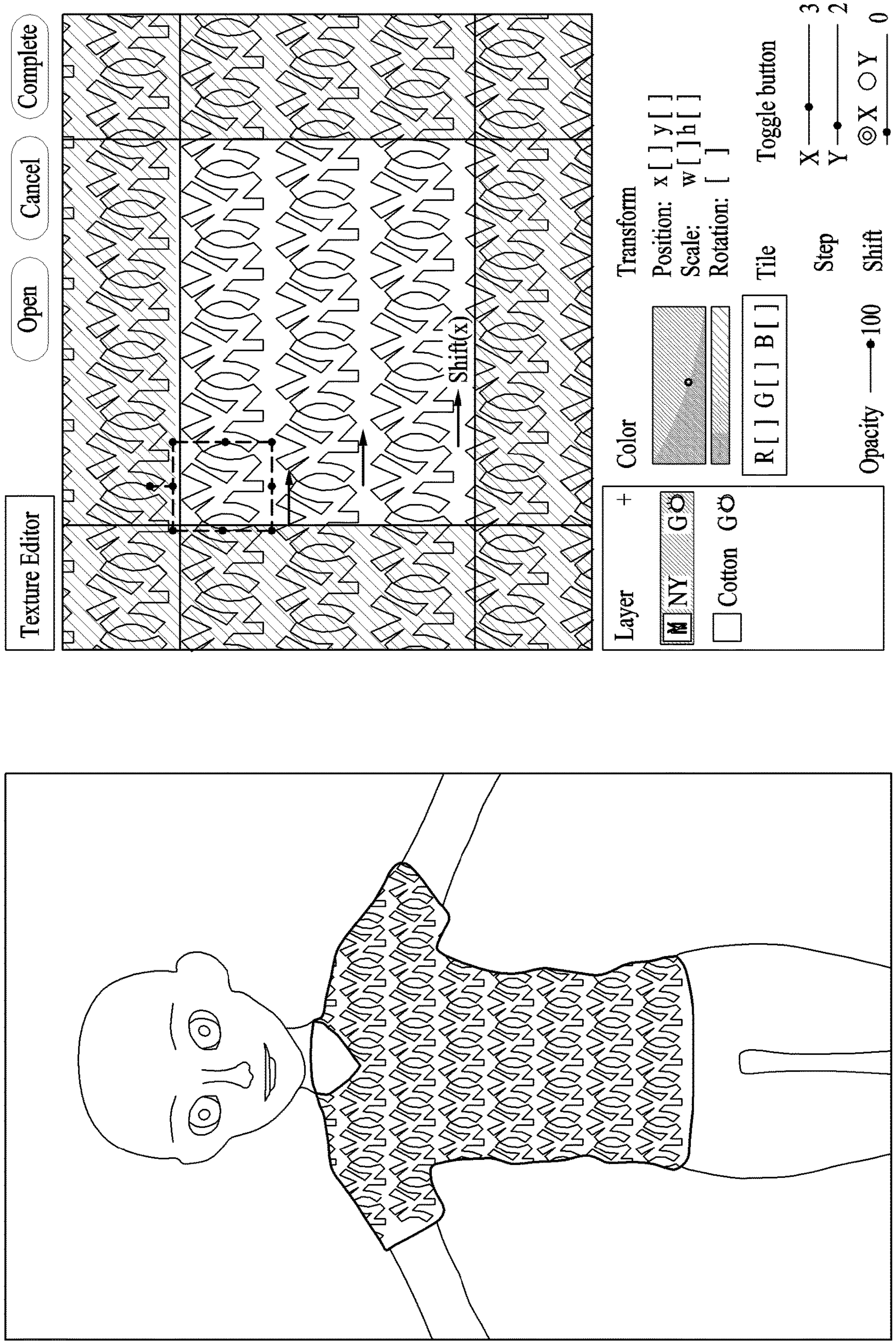
Figure 15:
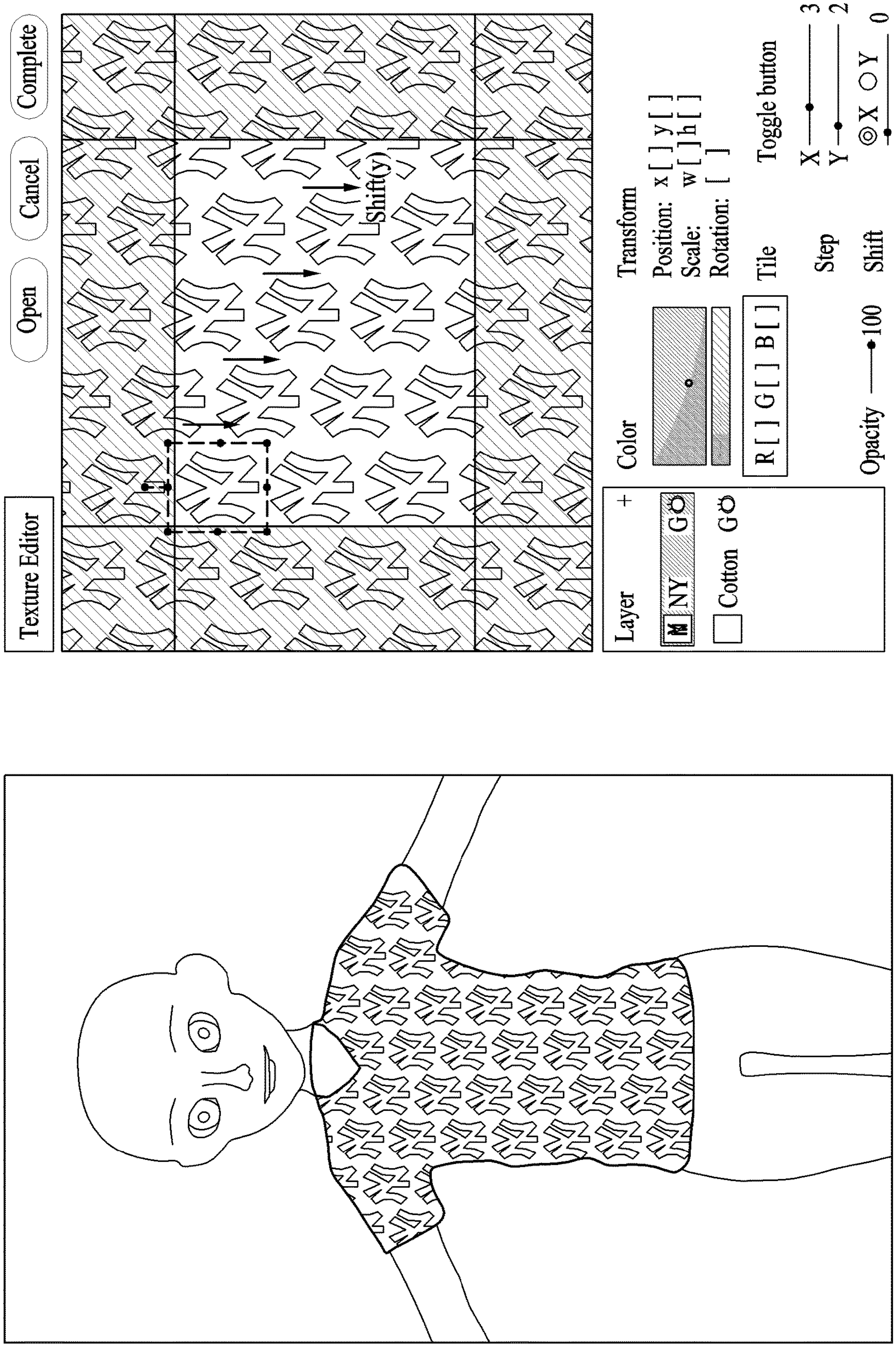

Referring to FIGS. 14 and 15, a simulation apparatus may generate, on the canvas 210, a result of shifting the image 240 applied with the iteration count in response to a user input for shifting the instances of the image.

Figure 16A:
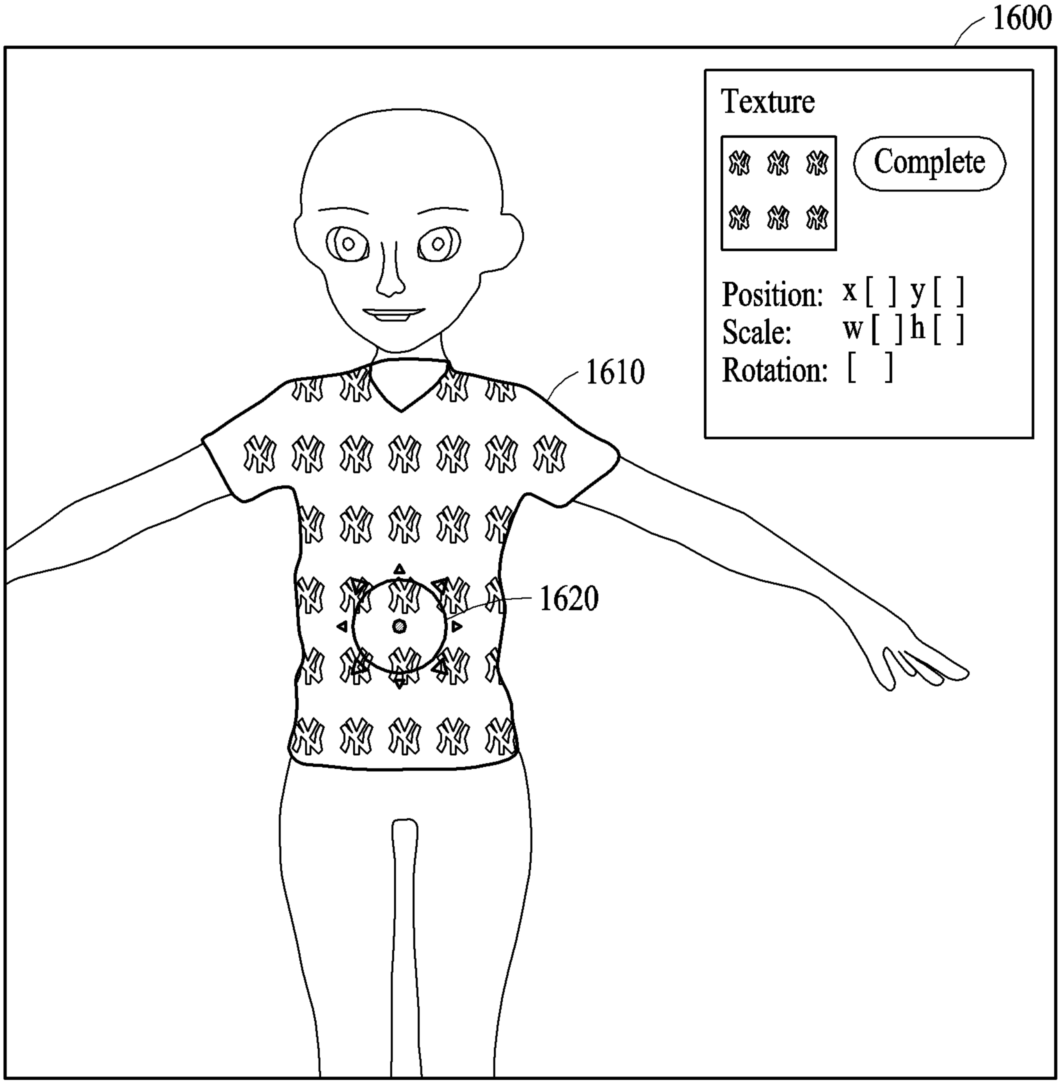
FIGS. 16A and 16B are diagrams illustrating transforming the repeated instances of a texture image, according to an embodiment.
Figure 16B:
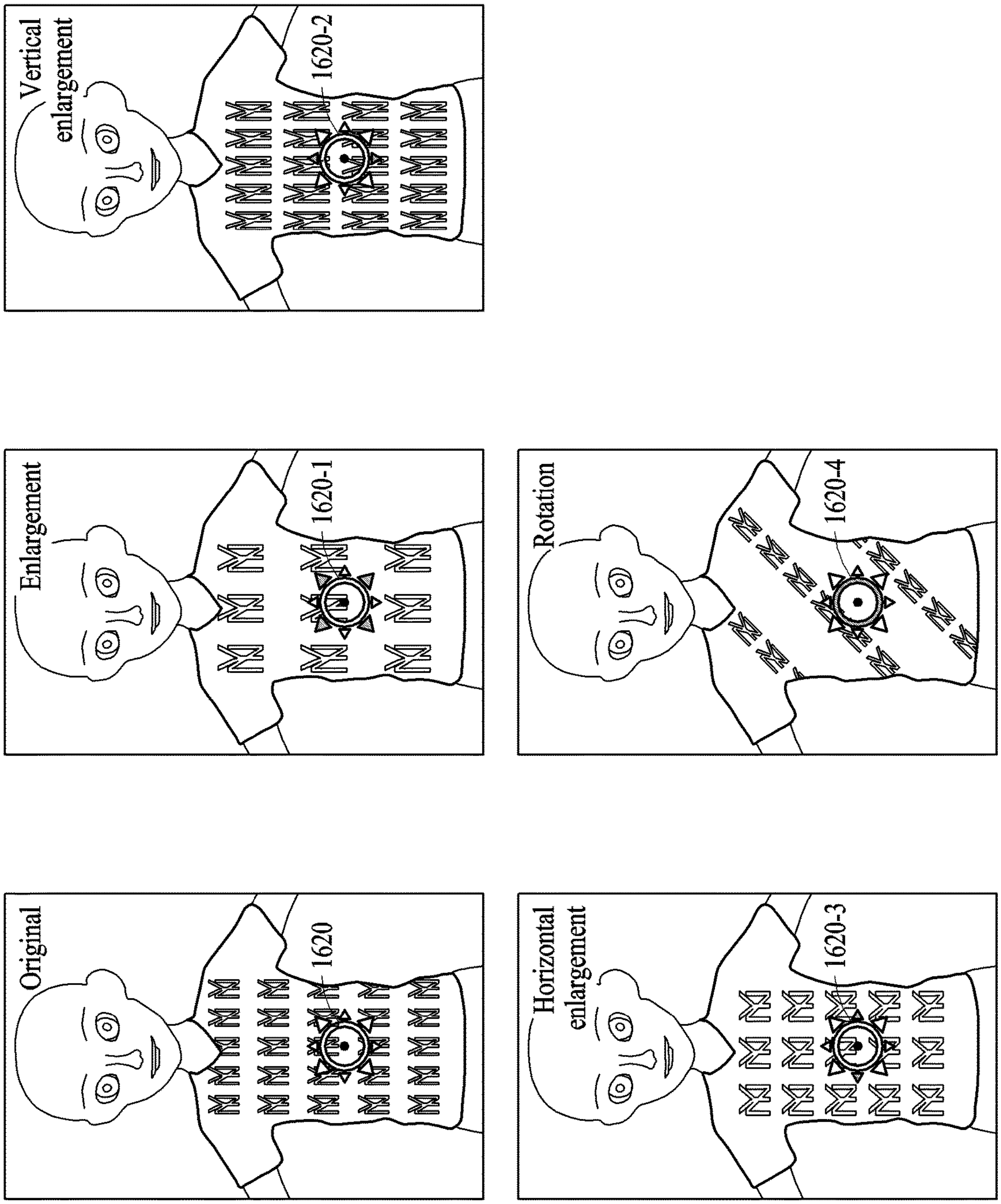

FIGS. 16A and 16B are diagrams illustrating transforming the repeated instances of a texture image, according to an embodiment. A simulation apparatus may simulate a 3D virtual garment 1610 with a texture of repeating instances of an image in a canvas displayed on a screen 1600. The simulation apparatus may move, scale, and/or rotate the repeating instances of an image pattern collectively by manipulating a user interface element (e.g., gizmo 1620). The gizmo 1620 may include a center point pointer for moving repeating patterns, eight triangular-shaped objects for scaling repeating patterns, and a circular-shaped object for rotating repeating patterns. The eight triangular-shaped objects may include four triangular-shaped objects positioned in a diagonal direction of the gizmo 1620, which scale width and height in equal ratios, and four triangular-shaped objects positioned on the top, bottom, left, and right sides of the gizmo 1620, which scale only in a width or height direction. The shapes of the aforementioned user interface element and pointer are not limited to the described embodiments, and their sizes and shapes may be modified to other suitable shapes.

By rotating the repeating patterns through the circular-shaped object, the gizmo 1620 may also rotate by the same angle as the rotation applied to the repeating patterns. More specifically, referring to FIG. 16B, the simulation apparatus may receive a user selection input for a specific garment in a 3D garment simulation. The simulation apparatus may visualize the boundary line of a selected garment (or pattern) to indicate that the garment (or pattern) is selected. Furthermore, the simulation apparatus may display the interfacing object 1620 on a screen for modifying the selected garment (or pattern). The interfacing object 1620 may be represented in various forms depending on modification functions. For example, the gizmo 1620 may be represented as a resizing user interface element for resizing in all directions 1620-1, a gizmo 1620-2 for vertical resizing, a gizmo 1620-3 for horizontal resizing, and a gizmo 1620-4 for rotation, as illustrated in FIG. 16B.

The gizmo 1620-1 for resizing in all directions may be a user interface element in which north-east, north-west, south-east, and south-west arrows may be visualized in different colors. A user may use the gizmo 1620-1 to enlarge or reduce the vertical and horizontal sizes of a texture. In this case, unit image included in the texture may be enlarged or reduced while maintaining the ratio of width and height.

The gizmo 1620-2 may be a user interface element in which northward and southward arrows from the interfacing object 1620 are visualized in different colors. The user may use the gizmo 1620-2 to enlarge or reduce the vertical size of the texture. For example, only the height of the unit image included in the texture may increase or decrease while the width of the unit image remains unchanged.

The gizmo 1620-3 may be a user interface element in which westward and eastward arrows from the interfacing object 1620 are visualized in different colors. The user may use the gizmo 1620-3 to enlarge or reduce the horizontal size of the texture. For example, only the width of the unit image included in the texture may increase or decrease while the height of the unit image remains unchanged.

The gizmo 1620-4 may be a user interface element in which a circular interfacing object from the gizmo 1620 is visualized in a different color. The user may use the gizmo 1620-4 to rotate the texture. For example, the simulation apparatus may rotate the unit image included in the texture based on a user input.

Figure 17:
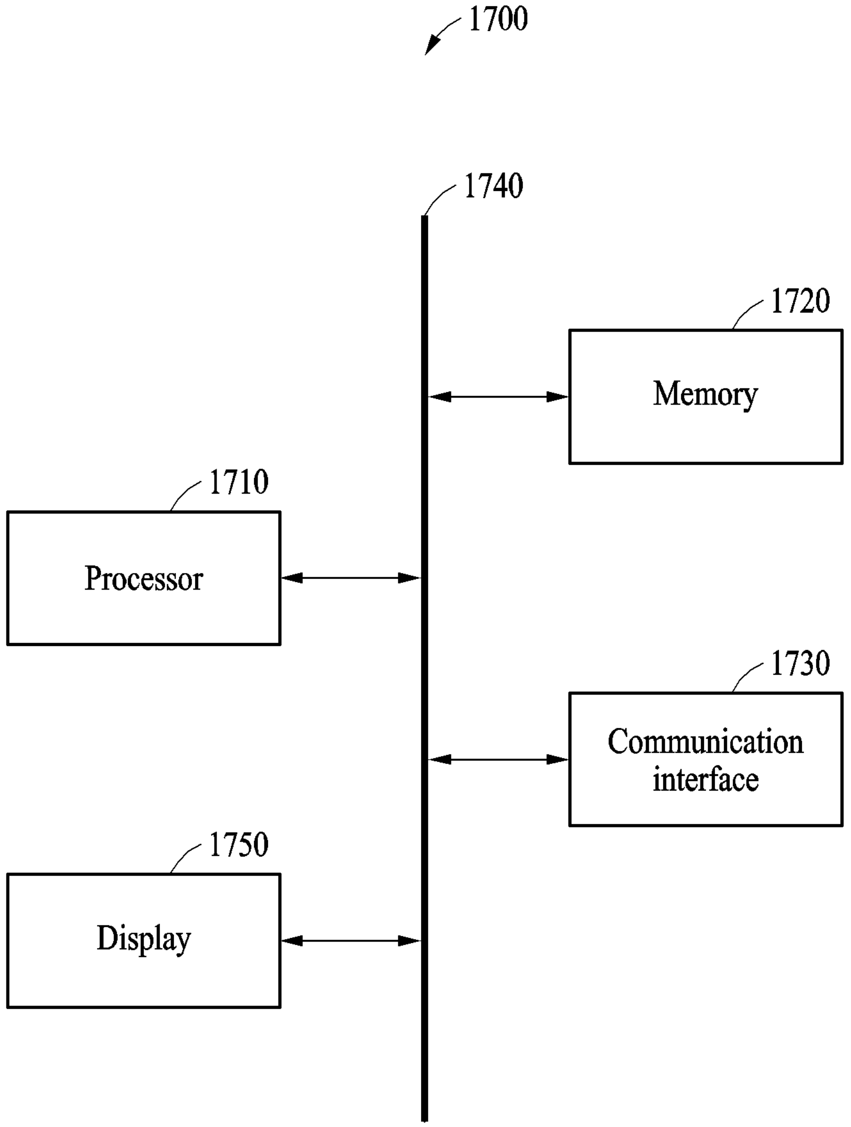
FIG. 17 is a block diagram illustrating an electronic apparatus according to an embodiment.

FIG. 17 is a block diagram illustrating an electronic apparatus according to an embodiment. Referring to FIG. 17, an electronic apparatus 1700 may include the processor 1710, a memory 1720, a display 1750, and a communication interface 1730. The memory 1720, the processor 1710, and the communication interface 1730 may be connected to each other via a communication bus 1740.

The memory 1720 may store a variety of information generated in the processing process of the processor 1710 described above. In addition, the memory 1720 may store a variety of data and programs. The memory 1720 may include a volatile memory or a non-volatile memory. The memory 1720 may include a large-capacity storage medium, such as a hard disk, to store a variety of data.

The display 1750 may display at least a portion of a 3D virtual garment provided by the processor 1710. In addition, the display 1750 may display various embodiments of a 2D texture image and a 2D canvas under the control of the processor 1710.

The processor 1710 may be a hardware-implemented apparatus having a circuit that is physically structured to execute desired operations. The desired operations may include, for example, code or instructions in a program. The hardware-implemented apparatus may include, but is not limited to, for example, a microprocessor, a central processing unit (CPU), graphics processing unit (GPU), a processor core, a multi-core processor, a multiprocessor, an application-specific integrated circuit (ASIC), a field-programmable gate array (FPGA), and a neural processing unit (NPU).

The processor 1710 may execute a program. Program code to be executed by the processor 1710 may be stored in the memory 1720.

The embodiments described herein may be implemented using hardware components, software components and/or combinations thereof. A processing device may be implemented using one or more general-purpose or special-purpose computers, such as, for example, a processor, a controller and an arithmetic logic unit (ALU), a digital signal processor (DSP), a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is singular; however, one of ordinary skill in the art will appreciate that a processing device may include multiple processing elements and multiple types of processing elements.

The software may include a computer program, a piece of code, an instruction, or some combination thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software may also be distributed over network-coupled computer systems so that the software may be stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. Examples of non-transitory computer-readable media include magnetic media such as hard disks, floppy disks, and magnetic tape; optical media such as CD-ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

Although the embodiments have been described with reference to the limited drawings, one of ordinary skill in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

What is claimed is:

1. A method for editing a texture of a garment, comprising:

displaying a texture image on a canvas representing a two-dimensional (2D) area;

receiving a configuration of repeating the texture image on the canvas, the configuration including a first iteration count indicating a number of times instances of the texture image are repeated in the canvas in a first direction;

determining interval parameters representing a separated distance or an overlapping distance between repeated instances of the texture image on the canvas according to the received configuration;

displaying the canvas with the repeated instances of texture image separated by the separated distance or overlapped by the overlapping distance according to the determined interval parameters;

applying the repeated instances of the texture image on the canvas to a three-dimensional (3D) representation of a garment;

dynamically displaying the repeated instances of the texture image on the 3D representation of the garment;

receiving a rotation of the texture image;

determining an updated size of the texture image in the first direction corresponding to the texture image as rotated;

updating the interval parameters based on the updated size of the texture image in the first direction and the first iteration count;

updating the repeated instances of the texture image according to the updated interval parameters; and dynamically displaying the canvas as updated with the updated repeated instances of the texture image.

2. The method of claim 1, further comprising:

receiving an updated configuration;

updating the interval parameters according to the updated configuration;

updating the repeated instances of the texture image according to the updated interval parameters; and dynamically displaying the canvas as updated with the updated repeated instances of the texture image.

3. The method of claim 1, further comprising receiving, from a user, a second iteration count as the configuration, the second iteration count indicating a number of times the instances of the texture image are repeated in the canvas in a second direction.

4. The method of claim 3, wherein the interval parameters are determined by:

determining a first interval parameter of the interval parameters by applying a size of the canvas in a first direction, a size of the texture image in the first direction, and the first iteration count to a first equation; and determining a second interval parameter of the interval parameters by applying a size of the canvas in a second direction, a size of the texture image in the second direction, and the second iteration count to a second equation.

5. The method of claim 1, wherein the repeated instances of the texture image extend beyond the canvas in a first direction responsive to one of the interval parameters representing a distance or overlap in the first direction being a negative number.

6. The method of claim 1, further comprising:

receiving a modification to the texture image;

updating the interval parameters to correspond to the received modification;

updating repeated instances of the texture image according to the updated interval parameters; and dynamically displaying the canvas as updated with the updated repeating texture images.

7. The method of claim 6, wherein the modification represents a change in a size of the texture image or an orientation of the texture image.

8. The method of claim 1, further comprising:

determining one or more shift parameters indicating shifting of relative locations of the repeated instances of the texture image displayed on the canvas.

9. The method of claim 8, wherein the one or more shift parameters are determined by:

a first shift index received from a user and indicating adjustment to a degree of shifting relative locations of adjacent rows of the repeated instances in a horizontal direction; or a second shift index received from the user and indicating adjustment to a degree of shifting relative locations of adjacent columns of the repeated instances in a vertical direction.

10. The method of claim 9, wherein the one or more shift parameters are determined by:

determining a first shift parameter of the one or more shift parameters by applying an iteration count in the horizontal direction, a size of the texture image in the horizontal direction, an interval parameter in the horizontal direction, and the first shift index to a first equation; or determining a second shift parameter in the vertical direction based on an iteration count in the vertical direction, a size of the texture image in the vertical direction, an interval parameter in the vertical direction, and the second shift index to a second equation.

11. The method of claim 10, wherein the first shift index is lower than an iteration count in the vertical direction, and the second shift index is lower than an iteration count in the horizontal direction.

12. The method of claim 1, further comprising:

displaying user interface elements for moving, scaling, or rotating each of the repeated instances of the texture image on the canvas; and displaying moved, scaled, or rotated versions of the repeated instances of the texture image in response to receiving a user input through the interface elements.

13. A non-transitory computer-readable storage medium storing instructions that, when executed by a processor, cause the processor to:

display a texture image on a canvas representing a two-dimensional (2D) area;

receive a configuration of repeating the texture image on the canvas, the configuration including a first iteration count indicating a number of times instances of the texture image are repeated in the canvas in a first direction;

determine interval parameters representing a separated distance or an overlapping distance between repeated instances of the texture image on the canvas according to the received configuration;

display the canvas with the repeated instances of texture image separated by the separated distance or overlapped by the overlapping distance according to the determined interval parameters;

apply the repeated instances of the texture image on the canvas to a three-dimensional (3D) representation of a garment;

dynamically display the repeated instances of the texture image on the 3D representation of the garment;

receive a rotation of the texture image;

determine an updated size of the texture image in the first direction corresponding to the texture image as rotated;

update the interval parameters based on the updated size of the texture image in the first direction and the first iteration count;

update the repeated instances of the texture image according to the updated interval parameters; and dynamically display the canvas as updated with the updated repeated instances of the texture image.

14. The non-transitory computer-readable storage medium of claim 13, further storing instructions that cause the processor to:

receive an updated configuration;

update the interval parameters according to the updated configuration; and update repeated instances of the texture image according to the updated interval parameters; and dynamically display the canvas as updated with the updated repeated instances of the texture image.

15. The non-transitory computer-readable storage medium of claim 13, further storing instructions that cause the processor to receive, from a user, a second iteration count as the configuration, the second iteration count indicating a number of times the instances of the texture image are repeated in the canvas in a second direction.

16. The non-transitory computer-readable storage medium of claim 13, further storing instructions that cause the processor to:

receive a modification to the texture image;

update the interval parameters to correspond to the received modification;

update the repeated instances of the texture image according to the updated interval parameters; and dynamically display the canvas as updated with the updated repeating texture images.

17. The non-transitory computer-readable storage medium of claim 13, further storing instructions that cause the processor to:

determine one or more shift parameters indicating shifting of relative locations of the repeated instances of the texture image displayed on the canvas.

18. A simulation apparatus comprising:

a display device;

at least one processor; and a memory storing instructions, the instructions when executed by the at least one processor cause the at least one processor to:

display a texture image on a canvas representing a two-dimensional (2D) area;

receive a configuration of repeating the texture image on the canvas, the configuration including a first iteration count indicating a number of times instances of the texture image are repeated in the canvas in a first direction;

determine interval parameters representing a separated distance or an overlapping distance between repeated instances of the texture image on the canvas according to the received configuration;

display the canvas with the repeated instances of texture image separated by the separated distance or overlapped by the overlapping distance according to the determined interval parameters;

apply the repeated instances of the texture image on the canvas to a three-dimensional (3D) representation of a garment;

dynamically display the repeated instances of the texture image on the 3D representation of the garment;

receive a rotation of the texture image;

determine an updated size of the texture image in the first direction corresponding to the texture image as rotated;

update the interval parameters based on the updated size of the texture image in the first direction and the first iteration count;

update the repeated instances of the texture image according to the updated interval parameters; and dynamically display the canvas as updated with the updated repeated instances of the texture image.

* * * * *